May 17, 1938.  R. O. RIDENOUR  2,117,985
SOIL PLASTICITY TESTING APPARATUS
Filed July 25, 1936
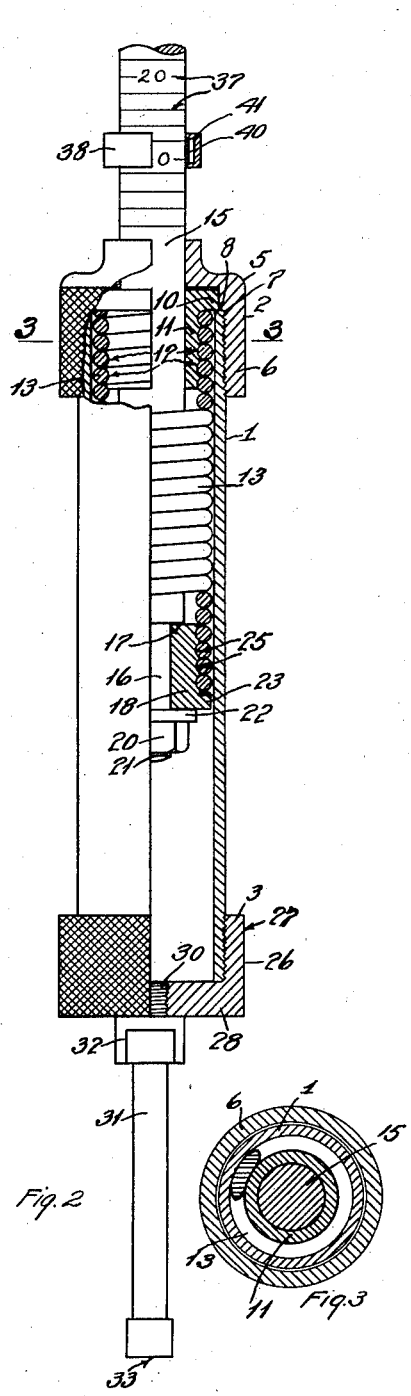
Fig.2
Fig.3
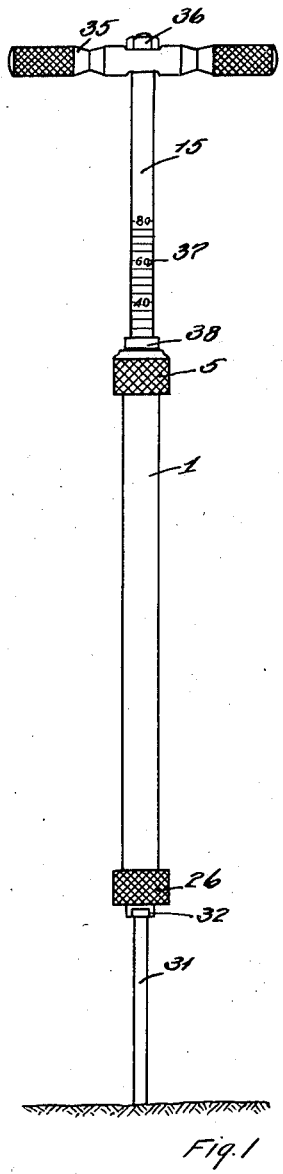
Fig.1
INVENTOR:
RALPH O. RIDENOUR,
BY Horace Barnes
ATTORNEY.

Patented May 17, 1938

2,117,985

UNITED STATES PATENT OFFICE 2,117,985

SOIL-PLASTICITY TESTING APPARATUS

Ralph O. Ridenour, Los Angeles, Calif., assignor of one-half to Ralph Roscoe Proctor, Los Angeles, Calif.

Application July 25, 1936, Serial No. 92,612

3 Claims. (Cl. 265—18)

This invention relates to improvements in apparatus for testing the plasticity of soils and to measure their resistance to penetration by water as determined by their adaptability for compaction.

The object of my invention is to provide an instrument of the class set forth of simple and practicable construction suitable for use in the field or laboratory that will measure in terms of pounds per square inch the force required to penetrate a soil at a predetermined rate of speed in order to determine its availability for employment as material for an earth dam or the like and so that constant control over the density and permeability of the dam material may be exercised.

Other objects and advantages residing in my invention, and objects relating to the details of construction thereof, will appear in the course of the detailed description to follow.

The accompanying drawing illustrates by way of example a representative form of my invention, in which:

Figure 1 is a view in elevation of an embodiment of my invention.

Fig. 2 is a fragmentary view of the same on an enlarged scale, shown partly in elevation and partly broken away and in vertical section.

Fig. 3 is a view in cross-section on line 3—3 of Fig. 2.

Referring to said views, the reference numeral 1 indicates the cylindrical, tubular body of my improved instrument provided with exterior screw-threads 2 and 3 at its upper and lower ends, respectively. A cap 5 closes the upper end of said body and is formed with a cylindrical flange 6 interiorly screw-threaded to engage the threads 2. The upper extremity of said body engages an annular shoulder 7 in spaced relation to the end wall of said cap to provide an annular ledge 8 upon which the radial flange 10 of a plug 11 is seated. Said plug extends axially in spaced relation from the inner wall of said body and is formed with an exterior spiral groove 12 formed on the same pitch and curvature as the individual coils of a spiral tension-spring 13. Said spring is secured to said plug by the latter being screw-threaded therein the uppermost spring-coil engaging the flange 10.

The cap 5 and the plug 11 are formed with axially aligned bores through which a cylindrical rod 15 extends into the body-chamber and is formed with a reduced end 16 providing a shoulder 17. A spring-plug 18 similar to the plug 11 is formed with an axial bore through which the end 16 of said rod extends and abuts upon the shoulder 17 and is retained thereon by a nut 20 engaged upon screw-threads 21 upon the extremity of said rod, a washer 22 being interposed. The plug 18 is formed with a peripheral flange 23 at its lower end and thereabove is provided with a spiral groove 25 similar to the groove 12 to engage the coils of the lower end of the spring 13 in the same manner.

The lower end of said body is closed by a cap 26 formed with a cylindrical flange 27 interiorly screw-threaded for engagement with the threads 3. The end wall 28 of the cap 26 is axially bored and screw-threaded to receive the screw-threaded tongue 30 of an axially directed penetration-needle 31 having an enlarged shoulder-boss 32 arranged to bear upon the wall 28 and provided at its lower extremity with a so-called "point" having a plane surface 33 of predetermined area.

The upper end of the rod 15 projecting from the cap 5 is surmounted by a cross-bar 35 constituting a handle secured by a nut 36. Said rod is provided with a graduated scale 37 calibrated in pounds or other measure with relation to the pull required to extend the spring 13. A channeled ring 38 is slidably mounted on said rod and is frictionally retained in any position on the rod by a circular spring 40 mounted in the channel 41 of the ring to indicate with reference to said scale the maximum amount of thrust exerted upon the rod to extend the spring through the engagement of the ring with the cap 5, or which may be set at any desired position along the scale to guide the operator in the application of the desired amount of pressure upon the rod.

The operation of my improved plasticity testing device may be described as follows: The penetration-needle 31 may be provided with a suitable point 33 adapted to the soil to be tested or changed bodily to furnish a plane surface of proper area to maintain the applied pressures within the limits convenient for the application of manual power, that is, between 5 and 100 pounds, the scope of the scale 37. Said areas will ordinarily range from 0.01 sq. in. to 1.5 sq. ins., and in a typical instance points bearing such areas will require 8 lbs., and 90 lbs., respectively, to penetrate a sample of earth at an approximately correct rate of speed, for example, about ½ in. per second. The operator grasps the handle 35 with both hands and thrusts the needle end into the soil at the rate of speed selected and the resistance thus encountered exerted by the operator on the handle will cause the distention of the spring 13 and the rod to slide into the body-chamber pushing the ring 38 upwardly upon the rod where it will remain to indicate the maximum pressure applied.

The calculations and charting of the results obtained from such tests are not pertinent to the presentation of this invention beyond mention that through them a high degree of accuracy in the selection of materials suitable for incorporation in an earth dam may be ascertained, or for testing the foundations of roadways and buildings, and for determining the proper degree of compaction the earth in the dam should receive during its construction.

The instrument may be used in the field for testing the earth in the barrow from whence the materials are obtained or on the dam itself during the construction, or it may be used in a laboratory and at the dam by utilizing samples of earth retained in cylinders, not shown, open at their tops and compacted to a uniform degree before the application of the testing instrument thereto.

Having described my invention, what I claim, is:

1. Earth-plasticity testing apparatus, consisting of a tubular body, a rod slidably mounted in one end of said body, a plug secured to the upper end of said body, a second plug secured to the lower end of said rod, a tension-spring connected at its opposite ends to said plugs, respectively, a penetration-needle having a point of predetermined area extending axially from the lower end of said body, a handle on the upper end of said rod, said rod provided with a graduated scale calibrated with reference to the extension of said spring, and a ring frictionally engaged about said rod in indicating relation to said scale.

2. Earth-plasticity testing apparatus, consisting of a tubular body, a rod slidably mounted axially of said body, a spring connected at one end to the upper end of said body and at its opposite end to the lower end of said rod, a handle connected to the upper end of said rod, and a penetration-needle mounted on the lower end of said body having a plane extremity of predetermined area.

3. Earth-plasticity testing apparatus, consisting of a tubular body, a rod slidably mounted in the upper end of said body, a plug secured in the upper end of said body formed with a spiral groove, a second plug secured to the lower end of said rod formed with a spiral groove, a spring connected at its opposite ends to said plugs, respectively, and within said grooves, and a penetration-needle having a plane lower extremity of predetermined area.

RALPH O. RIDENOUR.